(12) United States Patent
Taylor et al.

(10) Patent No.: US 8,580,015 B2
(45) Date of Patent: Nov. 12, 2013

(54) GAS CONCENTRATOR WITH IMPROVED WATER REJECTION CAPABILITY

(75) Inventors: Brenton Taylor, Kenwood, CA (US); Peter Hansen, Santa Barbara, CA (US)

(73) Assignee: Imogen, Inc., Santa Barbara, CA (US)

( * ) Notice: Subject to any disclaimer, the term of this patent is extended or adjusted under 35 U.S.C. 154(b) by 197 days.

(21) Appl. No.: 12/804,162

(22) Filed: Jul. 15, 2010

(65) Prior Publication Data

US 2010/0282084 A1 Nov. 11, 2010

Related U.S. Application Data

(63) Continuation of application No. 11/998,389, filed on Nov. 28, 2007, now Pat. No. 7,780,768.

(60) Provisional application No. 60/861,536, filed on Nov. 28, 2006.

(51) Int. Cl.
*B01D 53/04* (2006.01)
*A61M 16/10* (2006.01)

(52) U.S. Cl.
USPC .................. 96/4; 96/132; 96/142; 96/380

(58) Field of Classification Search
USPC ............ 96/4, 109, 111, 121, 132, 134, 136, 96/142, 380; 95/43, 47, 52, 96, 104, 105, 95/128, 148; 128/204.18, 205.12, 205.27
See application file for complete search history.

(56) References Cited

U.S. PATENT DOCUMENTS

| | | | |
|---|---|---|---|
| 4,636,226 A * | 1/1987 | Canfora | 95/138 |
| 4,822,384 A * | 4/1989 | Kato et al. | 96/110 |
| 4,931,070 A | 6/1990 | Prasad | |
| 4,934,148 A | 6/1990 | Prasad et al. | |
| 5,004,482 A | 4/1991 | Haas et al. | |
| 5,226,932 A * | 7/1993 | Prasad | 95/45 |
| 6,027,546 A * | 2/2000 | Kusters et al. | 95/52 |
| 6,471,744 B1* | 10/2002 | Hill | 95/19 |
| 6,551,384 B1* | 4/2003 | Ackley et al. | 95/96 |
| 6,585,808 B2 | 7/2003 | Burban et al. | |
| 6,740,140 B2 | 5/2004 | Giglia et al. | |
| 7,331,342 B2 | 2/2008 | Spearman et al. | |
| 7,396,390 B2* | 7/2008 | Hayashi et al. | 96/4 |
| 2005/0072425 A1* | 4/2005 | Spearman et al. | 128/204.17 |
| 2005/0235826 A1* | 10/2005 | Jensvold et al. | 95/52 |
| 2006/0231099 A1* | 10/2006 | Jeffers | 128/204.25 |
| 2008/0083331 A1 | 4/2008 | La Buda et al. | |
| 2008/0083332 A1 | 4/2008 | La Buda et al. | |
| 2008/0173175 A1 | 7/2008 | Spearman et al. | |
| 2009/0071333 A1 | 3/2009 | LaBuda et al. | |

* cited by examiner

*Primary Examiner* — Frank Lawrence, Jr.
(74) *Attorney, Agent, or Firm* — Mark Rodgers

(57) ABSTRACT

A feed gas drying system is described for a PSA or VPSA oxygen concentrator. A membrane dryer is inserted into the feed gas path to the concentrator absorbent beds, such that the moisture in the feed gas is directed to a part of the dryer exposed to the concentrator exhaust, thus achieving efficient operation of the membrane dryer with no loss of concentrator feed gas.

12 Claims, 11 Drawing Sheets

GAS CONCENTRATOR WITH IMPROVED WATER REJECTION CAPABILITY

RELATED APPLICATIONS

This application to is a continuation of U.S. application Ser. No. 11/998,389, filed Nov. 28, 2007, now U.S. Pat. No. 7,780,768, which in turn claims priority to U.S. Provisional application Ser. No. 60/861,536, filed Nov. 28, 2006

FEDERALLY SPONSORED RESEARCH

Not Applicable

SEQUENCE LISTING

Not Applicable

BACKGROUND OF THE INVENTION

1. Field of the Invention

The invention generally relates to gas concentrators, and more particularly relates to a concentrator having an integral system adapted for removing moisture from compressed gas feed stream to improve the performance efficiency of adsorbent beds. The application is particularly directed to compact; portable oxygen concentrators for therapeutic use, but the principles apply to any gas concentrator utilizing adsorbent beds.

2. Description of the Related Art

The application of oxygen concentrators for therapeutic use is known, and many variants of such devices exist. A particularly useful class of oxygen concentrators is designed to be portable, allowing users to move about and to travel for extended periods of time without the need to carry a supply of stored oxygen. Most of these portable concentrators are based on Pressure Swing Adsorption (PSA) or Vacuum Pressure Swing Adsorption (VPSA) designs which feed compressed air to selective adsorption beds. In a typical oxygen concentrator, the beds selectively adsorb nitrogen, resulting in pressurized, oxygen-rich product gas.

The main elements in a typical oxygen concentrator are shown in FIG. 1. Air is draw in, and typically filtered, at air inlet 1 before being pressurized by compressor 2. The pressurized air is directed by a valve arrangement through adsorbent beds 3. An exemplary adsorbent bed implementation, used in a concentrator design developed by the inventors, is three columns filled with zeolite powder. The pressurized air is directed through these columns in a series of steps which constitute a gas separation cycle, often a PSA cycle or some variation including vacuum instead of, or in conjunction with, compression. Although many different arrangements of beds are possible as well as a variety of different gas separation cycles, the result is that nitrogen is removed by the adsorbent material, and the resulting oxygen rich air is routed to a product gas storage device at 4. Some of the oxygen rich air can be routed back through the bed to flush out (purge) the trapped nitrogen to an exhaust 6. Generally multiple beds, or columns in the exemplary device, are used so at least one bed may be used to make product while at least one other is being purged, ensuring a continuous flow of product gas. The purged gas is exhausted from the concentrator at the exhaust 6.

Such systems are known in the art, and it is appreciated that the gas flow control through the compressor and the beds in a gas separation cycle is complex and requires precise timing and control of parameters such as pressure, flow rate, and temperature to attain the desired oxygen concentration in the product gas stream. Accordingly, most modern concentrators also have a programmable controller 5, typically a microprocessor, to monitor and control the details of the gas separation cycle and monitor various parameters. In particular, the controller controls the timing and operation of the various valves used to cycle the beds through feed and purge steps which make up the gas separation cycle. Also present in most portable concentrators is a conserver 7 which acts to ensure that oxygen rich gas is only delivered to a patient when a breath is inhaled. Thus less product gas is delivered than by means of a continuous flow arrangement, thereby allowing for smaller, lighter concentrator design. A pulse of oxygen rich air, called a bolus, is delivered in response to a detected breath via the conserver. A typical concentrator will also contain a user/data interface 8.

A portable oxygen concentrator must be small, light and quiet to be useful, while retaining the capacity to produce a flow of product gas, usually a flow rate prescribed by a medical practitioner, adequate to provide for a patient's needs. Although fixed site PSA based concentrators have been available for many years, such fixed site units may weigh 50 pounds or more, be several cubic feet in size, and produce sound levels greater than 50 dBA. A portable concentrator may weigh on the order of 10 lbs, be less than one half cubic foot in size, and produce as little as 35-45 dbA. The portable concentrators still need to produce the prescribed flow rate of oxygen to be considered beneficial for therapeutic use. Thus portable concentrators involve a significant amount of miniaturization, leading to smaller, more complex designs compared to stationary units. System size, weight and complexity may lead to fewer mitigative options or design choices, against contamination and other wear and tear effects.

One particular challenge of portable concentrator design is that the adsorbent beds must by necessity be small, yet capable of producing an adequate quantity of product gas. Since the adsorbent beds are optimized for maximum performance from a reduced size, any significant decrease in capacity of the beds over time can result in decreased product purity. One contributing factor that can lead to a decrease in bed capacity is the adsorption of impurities that do not completely desorb during normal process operation, leading to the accumulation and retention of impurities in the beds. An example of such an impurity that reduces the adsorption capacity of many zeolites used in air separation is water. Some stationary concentrators utilize some means of removing water from the compressed gas before feeding the adsorbent beds. Portable concentrators, by the nature of their application, are more likely to be exposed to a wide range of operating conditions including high humidity environments and/or rapid temperature changes that could result in the need for more sophisticated water rejection capabilities than implemented in prior designs. If water is present, either in the form of liquid or vapor, and enters the molecular sieve beds, the beds will irreversibly adsorb at least some of this water during each adsorption cycle. The energy of adsorption of water on zeolites is very high and not all water adsorbed during the adsorption steps in the process is desorbed during evacuation/purge of the beds under typical cycling. Therefore, complete removal of adsorbed water from zeolite beds usually entails applying some sort of energy to the beds, such as thermal, infrared, or microwave, and purging with a dry gas or applying a vacuum to the beds during the regeneration process. These regeneration processes are impractical in a portable concentrator. As a result, the accumulation of adsorbed water over time results in a reduction in capacity of the beds, as fewer sites are available for nitrogen binding.

Fewer binding sites in the adsorbent bed can result in a decrease in product purity over time, and ultimately a shortened service life of the concentrator. Many zeolites used in air separation, and in particular advanced adsorbents, particularly the high lithium containing low silica X type zeolite, are hydrophilic in their activated state and can therefore be prone to this problem. In the drive to make more compact and efficient devices, cycle frequencies increase, and adsorbent productivity increases accordingly with advances in process and adsorbent technology. The corresponding decrease in adsorbent inventory exacerbates the problem as the amount of gas processed per unit of adsorbent increases proportionally and the presence of impurities in the process gas can deactivate the adsorbents at a much faster rate than with conventional PSA processes, as described in U.S. Pat. Nos. 7,037,358 and 7,160,367, which are incorporated by reference herein.

It is therefore desirable to keep moisture out of the sieve beds without detrimentally affecting other characteristics of the portable oxygen concentrator. Although highly effective air drying systems exist in other fields, most of these systems consume power, increase size and weight, or reduce system efficiency in a manner detrimental to the stringent power consumption, size/weight, and acoustic noise level requirements of portable concentrators. Using a single process bed with some portion of the bed dedicated to impurity processing/rejection is a common method of adding impurity rejection to a gas separation system. Adding beds dedicated to dehydration of the feed stream upstream of the zeolite beds or implementing layered adsorbent beds utilizing desiccants in addition to adsorbents suited for the desired gas fractionation are also common methods of adding water rejection capacity to a gas separation system, and can be effective in many circumstances. However, additional beds add significant size and weight to the concentrator, or in the case of layered beds the desiccant layer displaces volume that could otherwise be used for adsorbent used for highly efficient air separation or the volume of the process columns could be decreased accordingly, and additional power is used to compress gas through this desiccant. The desiccants typically used for pre-drying air are also prone to deactivation during constant cycling as well as during shutdown periods, and are often regenerated via applying one of the aforementioned methods. In some cases, the desiccant layer may be advantageous, but also might not be entirely effective at protecting the specialized adsorbents from water damage. By their nature, personal oxygen concentrators, be they portable or stationary, often operate in varied usage modalities rather than in the continuous duty manner of an industrial gas production plant. The duty cycle, storage time between use, and storage environment, can vary widely from unit to unit. For example, home health care providers may have a fleet of units that are stored in warehouses that are not climate controlled while waiting for delivery to patients for use. Similarly, patients may store units in their car or home for a given period of time without use depending on their individual oxygen needs. U.S. Pat. Nos. 7,037,358 and 7,160,367 teach that extreme care must be used in shutting down and storing PSA units that are run on an intermittent basis. Any water (or other impurities) remaining in the desiccant layer(s) or portion of the bed used for feed gas drying upon shutdown will diffuse over time due to the gradient in chemical potential between the portion of the bed that is used for impurity removal during normal operation and the dry portion of the beds. The diffusion coefficient of water in zeolites has an Ahrennius type temperature dependence, so if a concentrator is stored in a high temperature environment the rate of intraparticle diffusion will increase exponentially with temperature. The gas phase diffusion rate will increase with increasing temperature as well. The above referenced patents disclose many preventative measures that can be performed during shutdown and storage of PSA units that are operated intermittently to mitigate these issues. In an oxygen concentrator it is advantageous to remove as much water as possible from the compressed gas feed stream to prevent deactivation of the highly efficient zeolite, use less desiccant, and minimize the presence of water in the beds during shutdown. Traditional means of removing water such as coalescing filters and gravity water traps have limited abilities to remove water and can thereby limit the usable service life of oxygen concentrating equipment. The varying operating and storage environments that portable concentrators may be exposed to result in design challenges that more conventional gas separation systems such as gas separation plants might not encounter and must be addressed.

BRIEF SUMMARY OF THE INVENTION

A preferred embodiment of the present invention is a gas concentrator with a membrane dryer combined with the gas separation section to avoid efficiency and power loss, and still achieve the needed air drying. The novel concentrator utilizes the waste gas of the gas separation section to sweep the membrane dryer system. In this configuration, approximately 90% of the feed gas can be used as sweep, since only a small amount of product gas is taken for delivery to the patient. The integration of the gas separation cycle waste gas and the membrane air dryer also enables the sweep of the membrane to be dynamically controlled, if necessary to control water removal, since the sweep flow is not dictated by a fixed orifice in the membrane dryer housing, but rather by the controllable valve system of the pressure swing adsorption unit.

In another preferred embodiment, the invention provides an oxygen concentrator including a compressor, and a gas separation section including adsorbent for gas separation. The concentrator further includes a membrane dryer. Feed gas is routed from the compressor through inlet side of the dryer to the adsorbent. The dryer's sweep side is swept by the exhaust gas from the PSA or VPSA process.

In another embodiment, the invention provides a method of drying air in an oxygen concentrator. The method includes the steps of routing feed gas through an inlet filter, through the compressor, vacuum pump or combination vacuum and pressure pump, through the inlet side of a membrane dryer, and finally into an adsorption based gas separation system, and utilizing exhaust gas from the gas separation process to sweep the sweep side of the dryer.

In another embodiment, the concentrator may include a condenser and water trap utilized in combination with the membrane dryer disposed prior to the beds.

In another embodiment, the concentrator may include a specialized desiccant layer of adsorbent disposed before the high performance air separation adsorbent to further suppress the amount of water or other impurities, such as $CO_2$, allowed to enter the adsorbent that is important to air separation.

In another embodiment, the concentrator may include a condenser and water trap utilized in combination with the membrane dryer and/or a specialized layer of adsorbent disposed before the high performance air separation adsorbent to further suppress the amount of water or other impurities, such as $CO_2$ allowed to enter the adsorbent that is important to air separation.

In one embodiment, the membrane dryer further acts as an exhaust muffler to decrease acoustic noise output from the concentrator. In another embodiment, the dew-point of the feed gas is monitored after the dryer, and the amount of sweep gas to the dryer is controlled to achieve a target dew-point level.

In another embodiment, the purge flow from the membrane dryer may be connected tic) the vacuum port of a pump in a VPSA system to enhance the pressure gradient across the membrane.

In another embodiment, the selectively permeable membrane may be designed to both transport water vapor and nitrogen gas selectively across the membrane where it is removed from the feed stream. The nitrogen depleted air would then enable more oxygen production from a given amount of sieve material than without the presence of a membrane dryer. Alternatively, this embodiment could result in smaller amounts of sieve material required for the adsorption separation process to reach a concentration suitable for therapeutic use. In another embodiment, the sweep gas from the exhaust is supplemented with a portion of the feed gas.

In another embodiment, the invention provides an oxygen concentrator including a compressor, and a gas separation section including a structured adsorbent system that increases the surface area of accessible zeolite beyond that achieved by conventional beaded adsorbents. The concentrator further includes a membrane dryer. Feed gas is routed from the compressor through the active portion of the dryer to the beds. The dryer's outer surface is swept by the exhaust gas from the beds.

BRIEF DESCRIPTION OF THE DRAWINGS

The understanding of the following detailed description of certain preferred embodiments of the invention will be facilitated by referring to the accompanying figures.

DETAILED DESCRIPTION OF THE INVENTION

Figure 1:
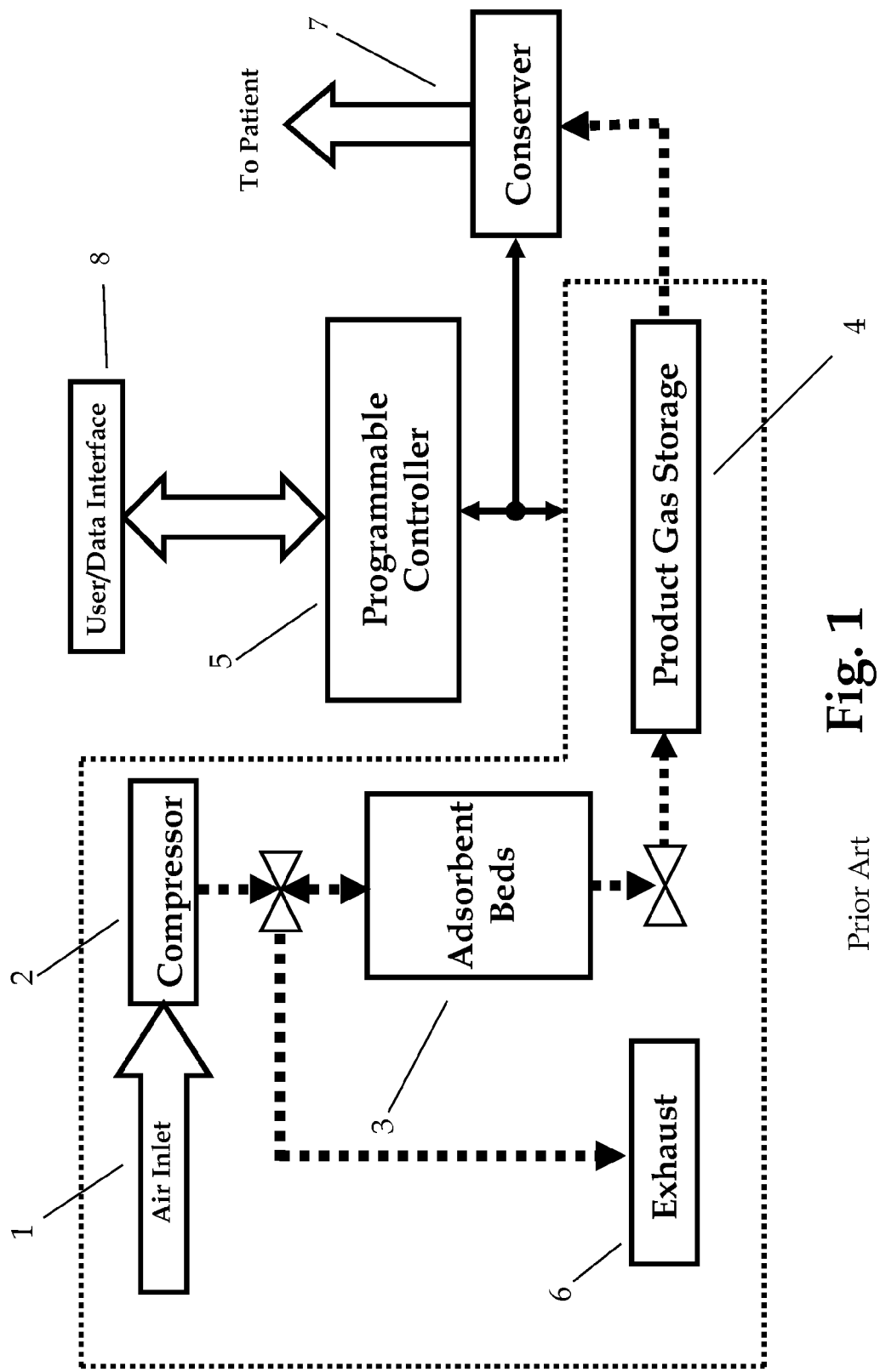
FIG. 1 shows the general elements of gas concentrators as applicable to certain embodiments of the invention.

Referring to FIG. 1, general features of a gas concentrator are shown. Typically gas is drawn into the inlet through an inlet filter 1 into a compressor 2. Compressed air is then delivered (through various filters and other devices) to a gas separation section for selectively adsorbing a component of the gas. The preferred embodiments of the invention, although applicable to a variety of gas concentrator implementations, will be described in detail for the case where the inlet gas is air, and the gas separation section is PSA, VSA, VPSA or some combination thereof, utilizing adsorbent beds 3 which selectively adsorb nitrogen, producing oxygen rich product.

A variety of gas separation section cycle types and bed arrangements are known in the art, most of which can benefit from the preferred embodiments of the invention. Whatever the details of the gas separation section 3, typically product gas is accumulated in a storage device 4. Storage devices may include a tank in the traditional sense, or may be some other device effective for holding a volume of gas, such as a tube, or some other volume filled with a high surface area-to-volume powder. Many modern concentrators used for therapeutic applications also include a programmable controller 5 to operate the concentrator and provide for user interface 8 and communications. Also typical are gas exhaust 6, and delivery to patient, which often is through a conserver device 7.

A problem with selective adsorbent bed technology, particularly when the adsorbing medium is a zeolite, is that the adsorbing medium may trap water vapor present in the feed gas due to the much higher energy levels required to desorb water than to desorb nitrogen (regeneration of saturated beds typically occurs at 300 degrees C. or greater). The trapped water can partially fill the sites available for nitrogen binding over time. This is a particularly serious problem for portable concentrators, which are generally designed without significant capacity margin to conserve size, weight, and power consumption. However, water retention in the adsorbing section is a problem for all concentrators which are fed by ambient air. Thus most concentrators utilize some method of at least partially drying the feed gas between the compressor and the beds, utilize a much larger than necessary adsorbent inventory, or have a short service interval to replace the adsorbent beds.

An oxygen concentrator designed by the inventors, for instance, uses a compressor and water trap arrangement, described in U.S. Pat. No. 7,066,985, which is incorporated by reference herein in its entirety. Such an arrangement is partially effective, and has the advantage that it does not negatively affect the efficiency of the concentrator, i.e., utilizing additional power or decreasing output to achieve the drying function. However, such efficient drying means have not been found to be completely effective for all uses, particularly when the concentrator is used in a humid environment or other conditions which do not promote condensation (and subsequent removal of liquid water from the feed stream) prior to moist air entering the beds. Thus, in some instances it has been found that the beds become saturated with water as a function of the number of cycles run and the operating environment, resulting in a capacity loss and a decrease in product purity proportional to the decreased capacity. Additionally, water remaining in the beds during shutdown periods or intermittent use will diffuse from the wet (feed) end of the bed towards the dry (product) end of the bed. In either case this effect may shorten the service life of the concentrator.

Other, more effective, drying systems exist that could be adapted to gas concentrators from other drying technologies, such as replaceable desiccant cartridges or refrigeration drying system, but due to most of these entailing increased power consumption, decreased product output, or increased service requirements, they have not to date been employed in portable gas concentrators.

One particularly effective means for removing water vapor from air is a membrane dryer. Membrane permeation is a technology adapted for drying compressed air systems. Membrane air dryers allow for substantial dew-point suppression of the compressed air stream through selective transport of water vapor through a hollow-core membrane fiber. The membranes can be engineered such that water vapor is allowed to permeate, while oxygen and nitrogen are not.

Figure 2:
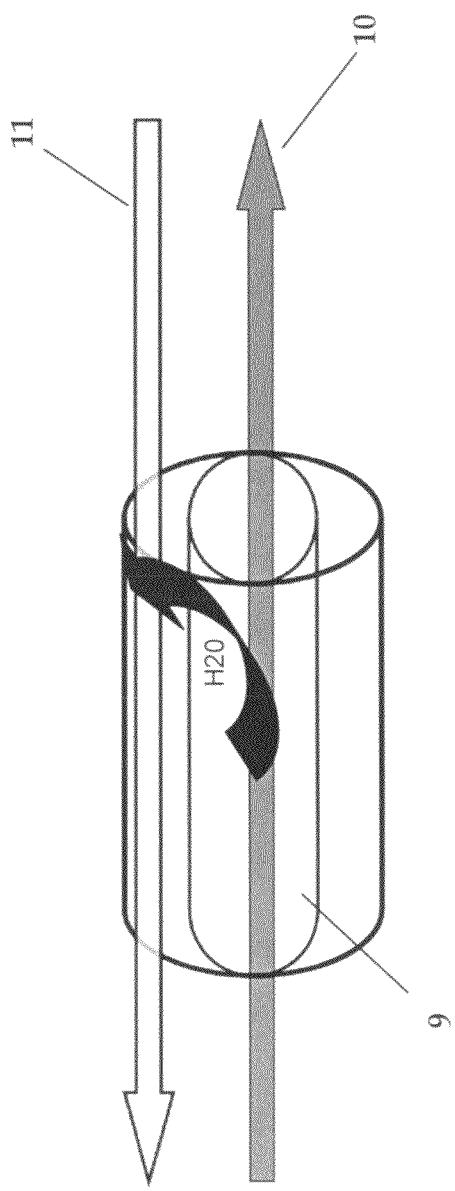
FIG. 2 illustrates the general operation of an exemplary membrane dryer.

A membrane dryer is illustrated in FIG. 2. The feed gas 10 is injected into the bore, or inlet side, of the hollow fiber 9, where the water vapor is transported across the membrane to the outer surface, or sweep side, of the fiber. Some percentage of the dried compressed air, typically 5-50%, is used as a sweep 11 to drive the water vapor off the fiber surface to allow for continued transport of water from the bore of the hollow fiber to the outer surface. Although a cylindrical arrangement, with the inner area being the inlet side and the outer area being the sweep side, is used by way of example, other arrangements of inlet and sweep side geometries are known and should be considered within the scope of the invention.

In a portable oxygen concentrator, the power consumption must be kept to a minimum. Therefore, losing 5-50% of the product of the compressor system is not feasible, even though drying of the feed gas before the sieve beds is advantageous. However, an oxygen concentrator produces dry oxygen rich product, and creates nitrogen rich exhaust. Much of the exhaust gas is nearly as dry as the product gas. Although much of the moisture entering the device through the feed stream is being rejected upon the exhaust and purge portion of the adsorbent section cycle, the gas exiting the device is expanding which further enhances its dryness compared to the feed stream. Additionally the gas has a high velocity. This enables a novel approach to the application of membrane dryers in oxygen concentrators that effectively does not -decrease the efficiency of the concentrator, yet substantially increases the service life and environmental ruggedness of the device.

Figure 3:
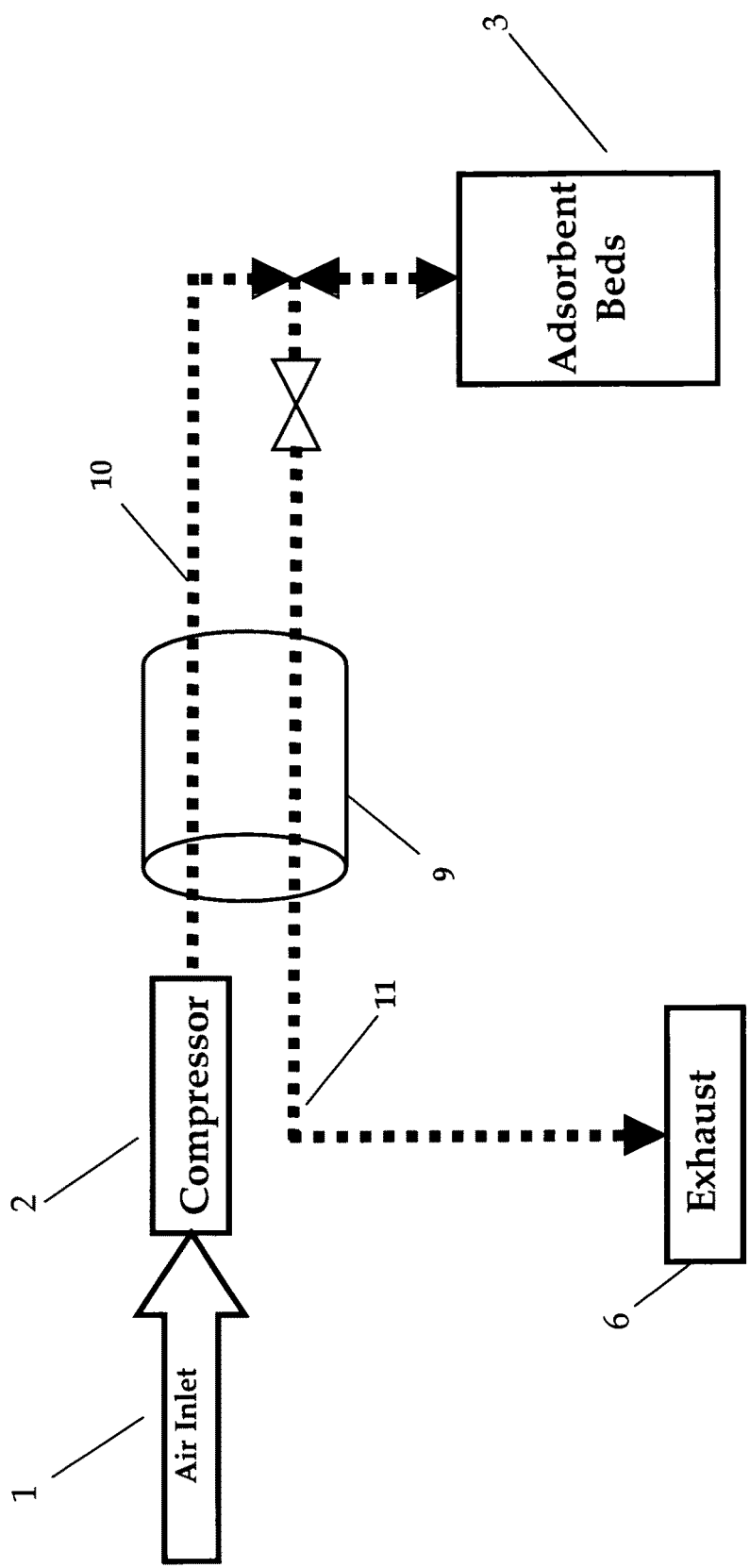
FIG. 3 is a block diagram of a preferred embodiment of the invention.

As shown in FIG. 3, the advantages of a membrane dryer can be combined with the gas separation section to avoid efficiency and power loss, but still achieve the needed air drying. The dryer 9 is placed between the compressor 2 and adsorbent beds 3. Feed gas 10 is routed through the dryer active area 9 before delivery to the beds. The invention includes the novel idea of using the waste gas 11 of the gas separation section to sweep the membrane dryer system. In this configuration, approximately 90% of the gas input to the device can be used as sweep, since only a small amount of product gas is taken for delivery to the patient. Thus the sweep is gas that is exhausted anyway, so the dryer is swept with no effective loss of concentrator efficiency and substantially more airflow than would normally be available, since the exhaust gas is not parasitic to the input flow to the dryer.

Figure 4:
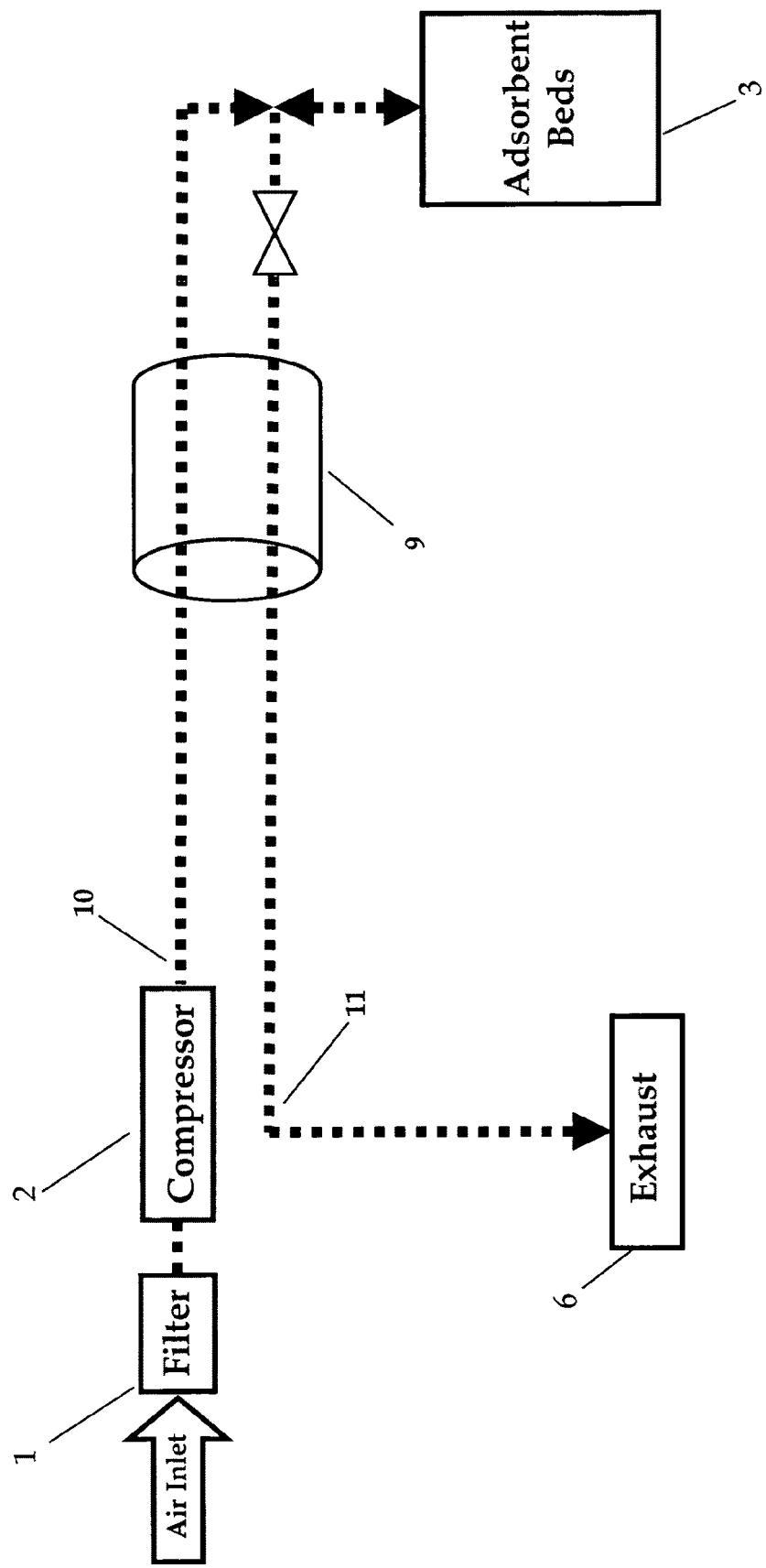
FIG. 4 is a block diagram of another embodiment of a preferred embodiment of the invention.
Figure 5:
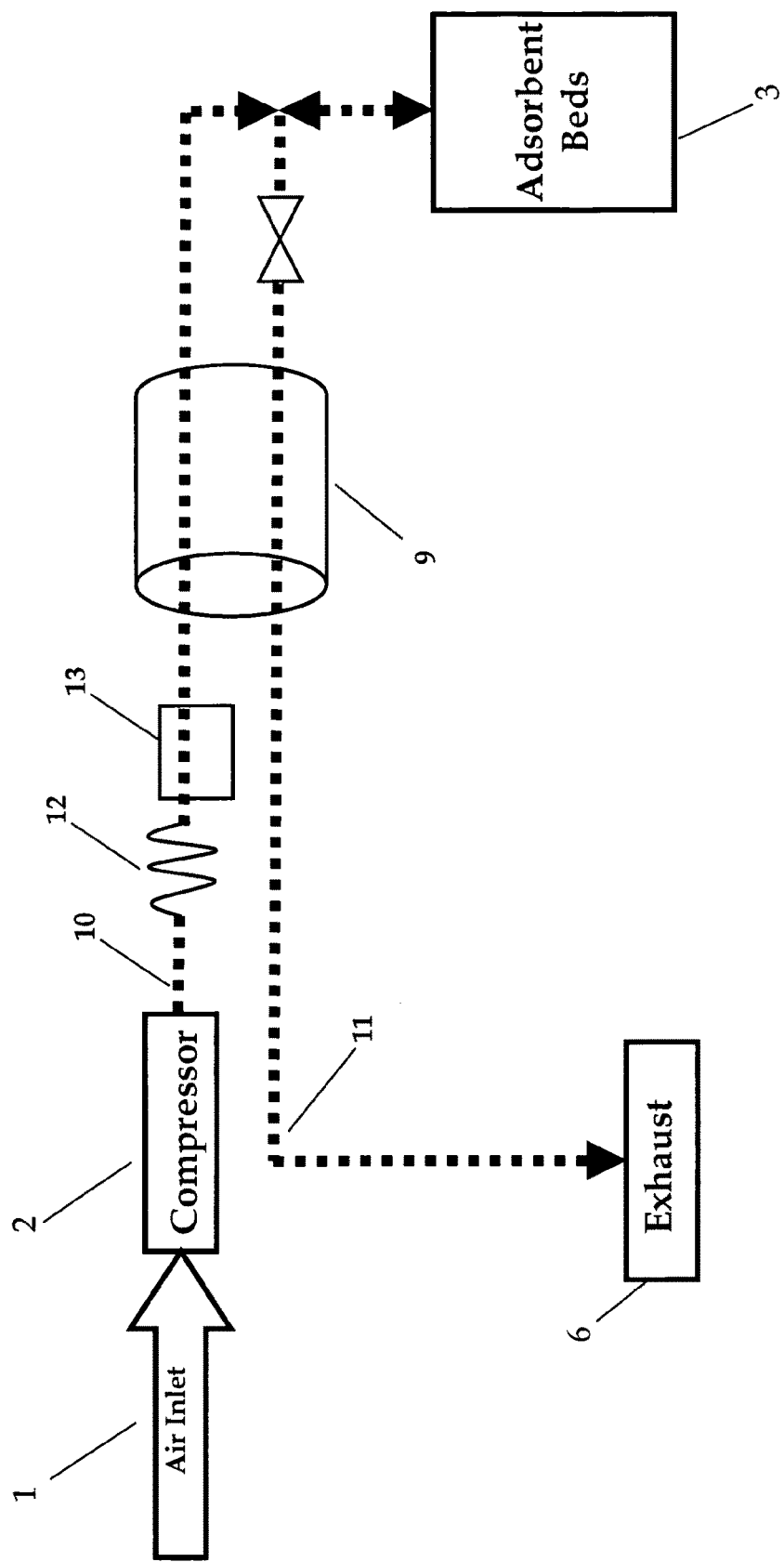
FIG. 5 is a block diagram of another embodiment of the invention.
Figure 6:
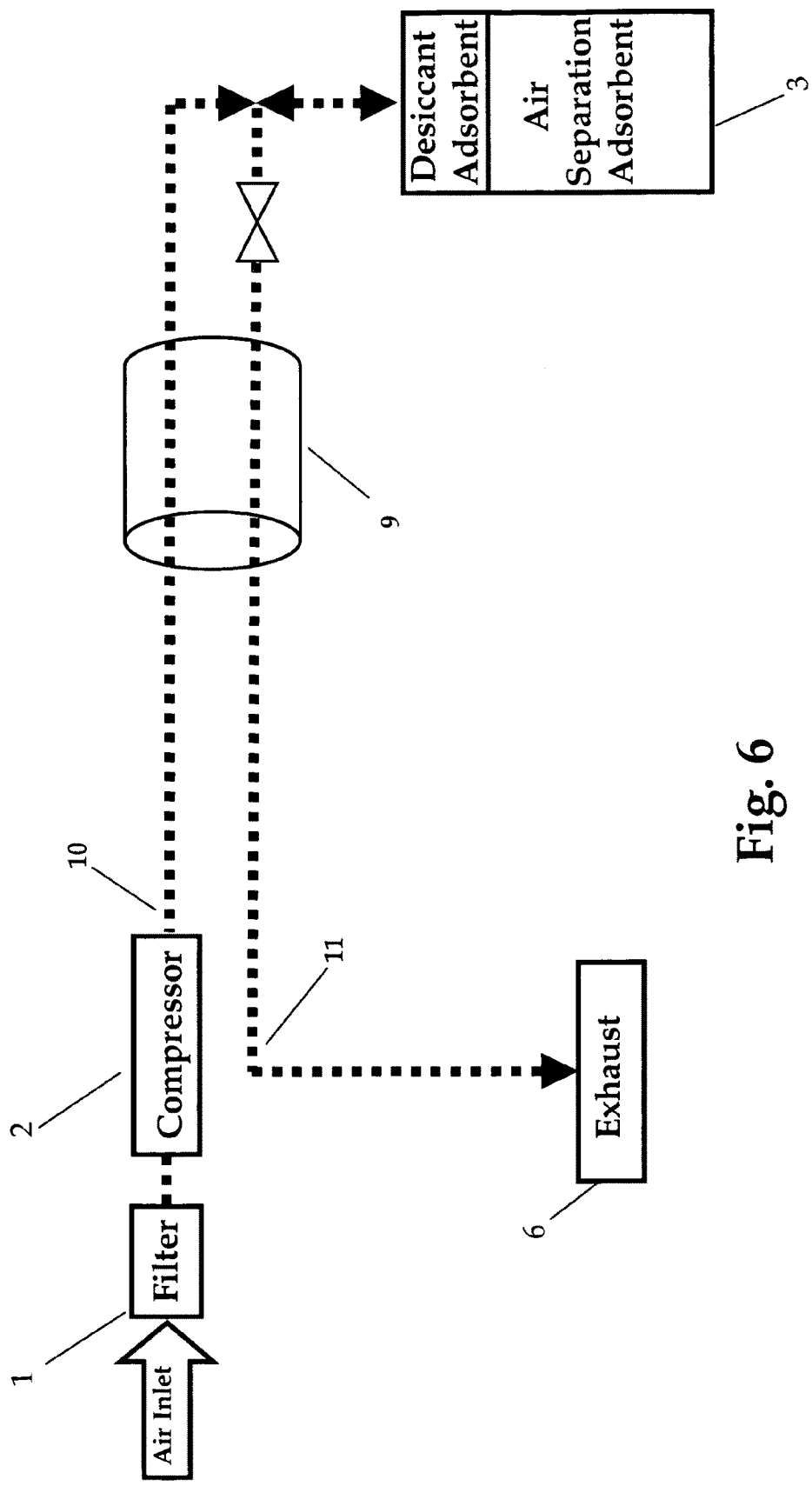
FIG. 6 shows an embodiment of the invention adding water removal to the beds
Figure 7:
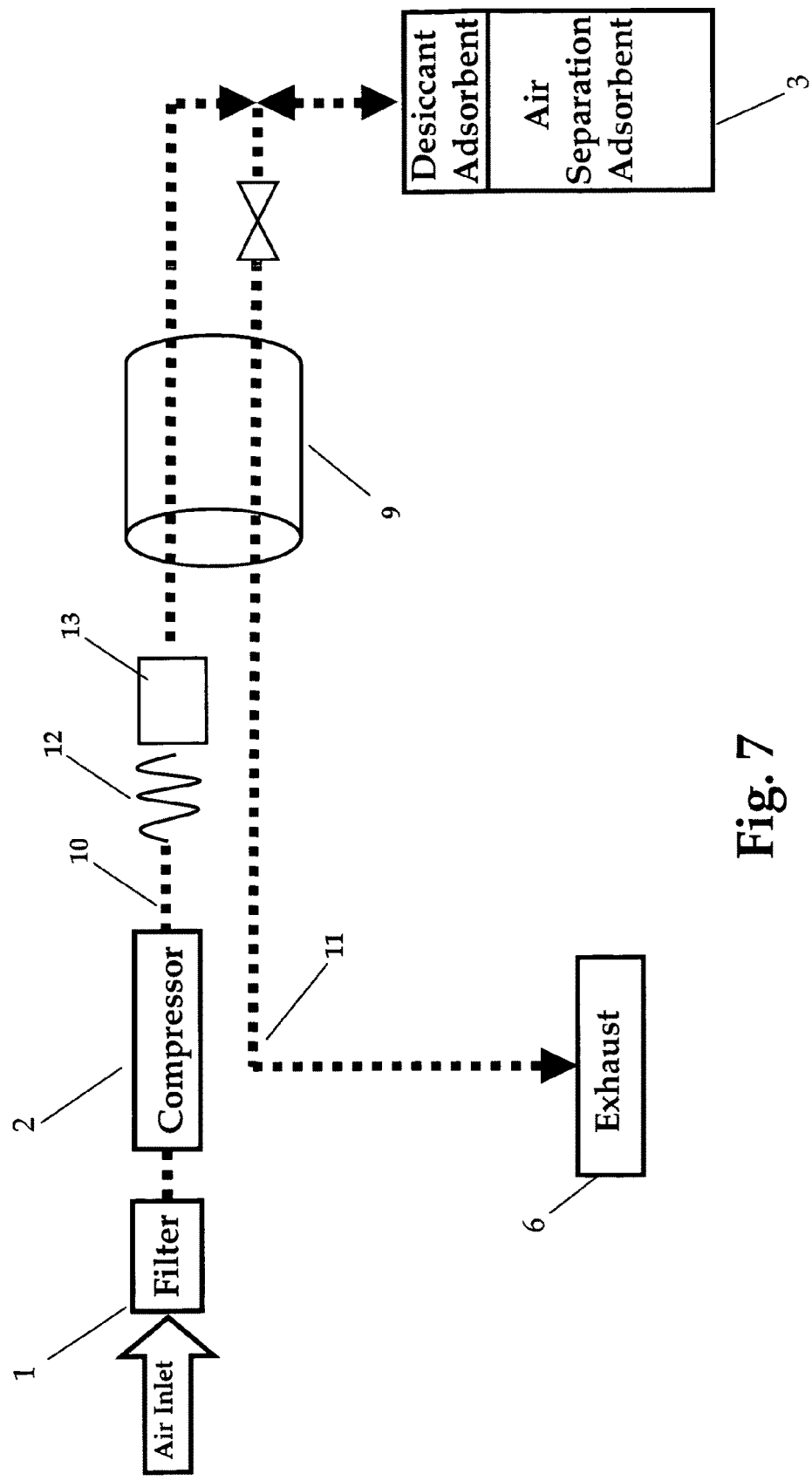
FIG. 7 shows a version of the invention, which utilizes multiple water rejection schemes.

The dew-point suppression of an integrated membrane air dryer and gas separation system could also be expanded to incorporate a staged water removal system. A simple staged system is shown in FIG. 4, wherein a simple water filter 1 is added to the air inlet. Even a coarse filter could significantly reduce the load on the membrane dryer 9. As shown in FIG. 5, many concentrators already have some air drying capability. The figure shows the elements of the system described in U.S. Pat. No. 7,066,985, including condenser 12 and water trap 13 which operates by trapping liquid water in a gravity trap and using the high velocity waste gas to remove the liquid water from the system. Such additional water mitigation systems can be utilized in conjunction with a membrane dryer to achieve a desired dew-point of feed gas. A coalescing member or thermoelectric cooler combined with a liquid water trap/vent could be used to lower the temperature of the output gas from the compressor to force condensation and lower the dew-point of the gas as it travels through the air preparation system prior to entering the adsorbent beds. As shown in FIG. 6, additional water mitigation systems could be used in conjunction with the membrane dryer, such as a layered bed using activated alumina, silica gel, or other desiccants to aid in any drying not accomplished in the membrane without compromising the zeolite bed. The addition of a desiccant to the beds can also be combined with a staged drying system, as shown in FIG. 7. A combination of layered an un-layered beds could also be used.

In some implementations, the efficiency of the gas separation section might be improved and maintained longer due to the removal of water and other impurities from the feed gas stream of the gas separation section via the membrane since the feed gas would be depleted of impurities. This effect could be further improved by utilizing a shallow layer of specialty adsorbent at the feed end of the adsorbent bed that would have a greater capacity to remove water and regenerate much easier than the high lithium type X zeolites that are ideal for medical oxygen generation. The membrane and desiccant system can be designed to remove other trace impurities that would increase the productivity and recovery of the gas separation rather than simply extending the service life of the device.

Figure 8:
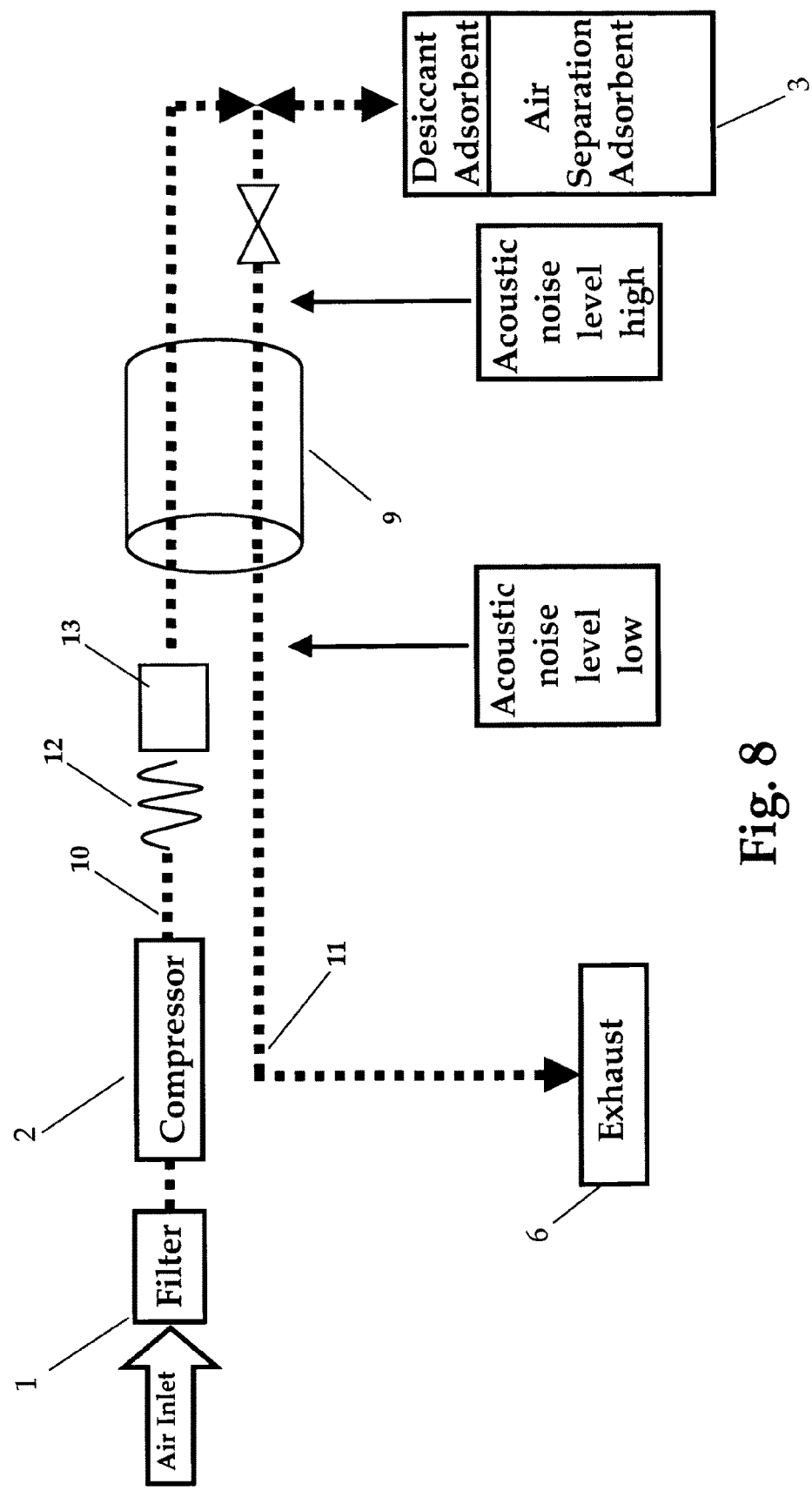
FIG. 8 shows the dryer element simultaneously operating as noise muffler as well as dryer.

Integration of the membrane air dryer and the portable oxygen concentrator may also yield improved noise reduction since the large body of the membrane air dryer could be designed as an integrated muffler as shown in FIG. 8. By creating multifunctional volumes (dryer/muffler) the overall displacement volume of a portable oxygen concentrator can remain low while simultaneously improving overall system specifications.

Figure 9:
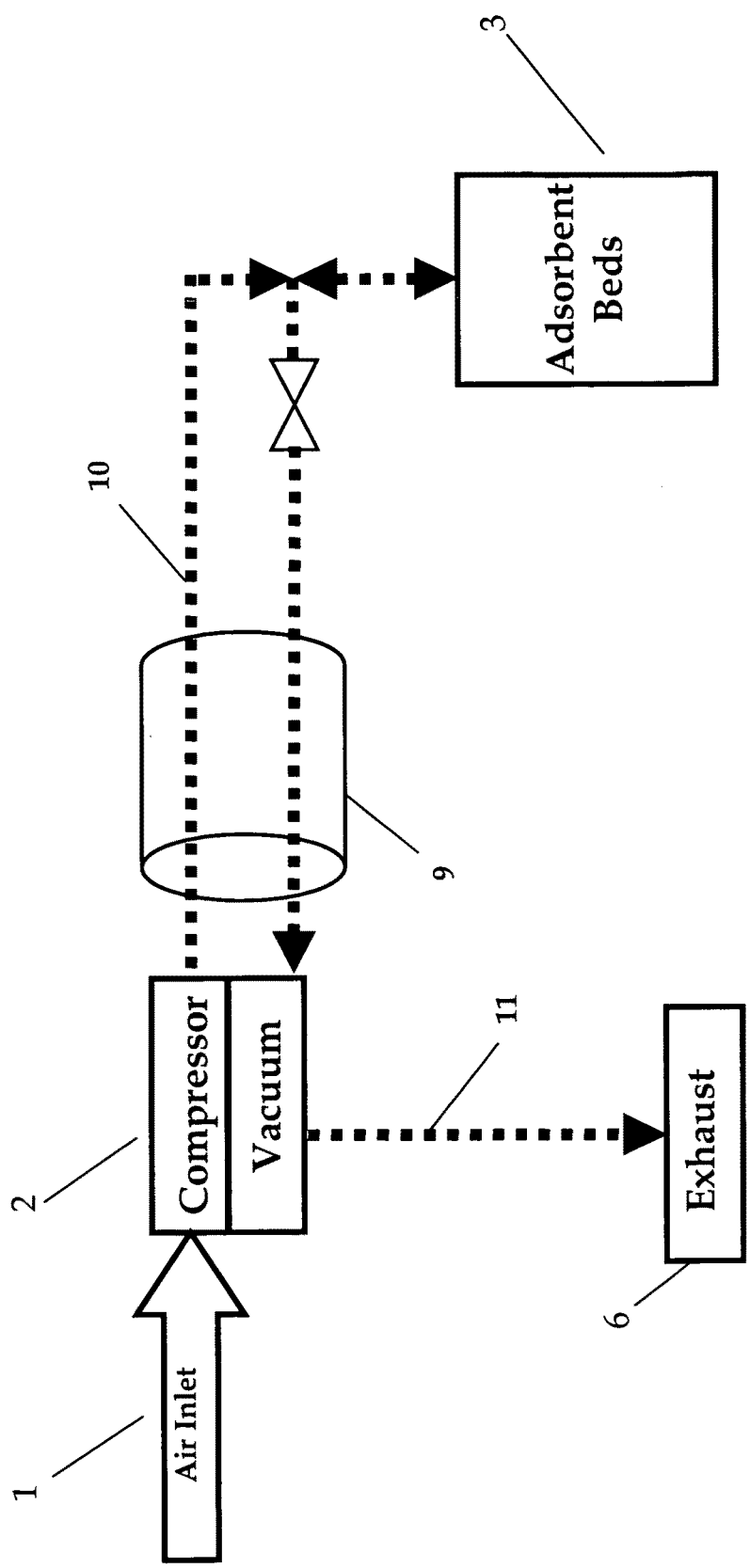
FIG. 9 shows an embodiment of the invention in a VPSA system

In an embodiment of the invention where the gas separation section design includes a vacuum pump to reduce the low pressure to sub atmospheric levels (VPSA), the membrane dryer can be placed between the beds and the vacuum pump in the exhaust line to further improve the efficiency of the membrane dryer as depicted in FIG. 9. Applying a vacuum to the sweep side of the membrane dryer is known in the art to increase the water transport capacity of the dryer as in U.S. Pat. No. 5,226,932, which is incorporated by reference in its entirety. By combining the advantages of the large volume fraction of sweep gas enabled by the membrane dryer and PSA integration along with the available vacuum levels present in a VPSA system, a drying system may be achieved where the dryer itself can be smaller than in other embodiments or the dew-point suppression of the dryer may be increased.

Figure 10:
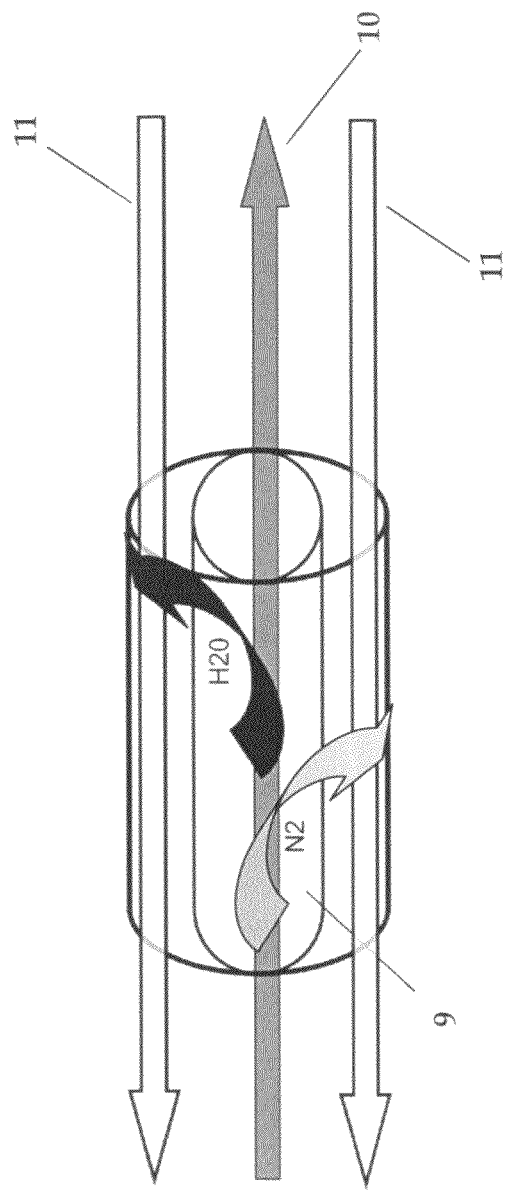
FIG. 10 shows an embodiment of the invention configured with a specially designed membrane that selectively transports both water and nitrogen across the membrane, but not oxygen.

The art of selective membrane design has allowed the design of membranes that selectively transport just water or nitrogen or oxygen across the membrane while allowing the other constituents of the feed stream to remain unaffected. In a preferred embodiment the design of the membrane in the membrane drier might be designed to transport both water and nitrogen across the membrane to increase overall system efficiency as seen in FIG. 10. In this case some portion of the nitrogen in the feed stream would be shunted directly into the waste stream of the gas separation section. Currently, generating high purity oxygen with just a selective membrane is difficult and not as efficient as using a PSA system, or the like, but with the combined advantages of both systems operating together, the overall design of the portable oxygen concentrator may be optimized.

Figure 11:
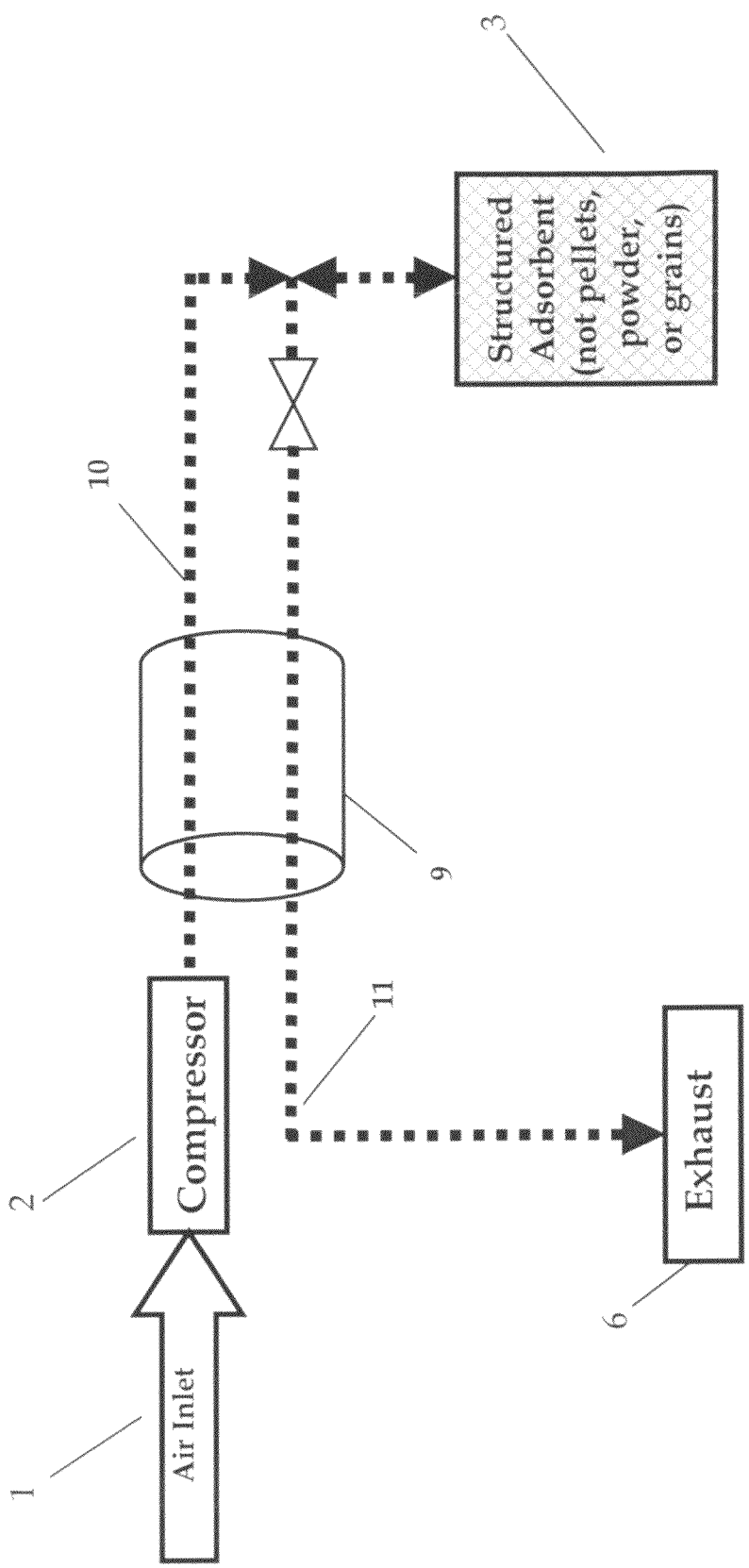
FIG. 11 shows an embodiment of the invention with the addition of a structured adsorbent bed rather than the typical zeolite beads.

The design advantages of using a structured adsorbent bed are known in the art of pressure swing adsorber design. These designs replace the more standard zeolite beads or powder with a zeolite structure, such as tubes made from zeolite crystal. Such designs can increase the surface area to volume ratio of the adsorbent far beyond the levels available in the typical zeolite beads. By increasing the surface area of the adsorber bed, the kinetics of adsorption and desorption are increased, allowing more cycles per minute and correspondingly more oxygen production per unit mass of zeolite when compared to zeolite beads. These structured bed designs may be particularly susceptible to water loading due to high volume of air passed through the small amount of adsorbent. As depicted in FIG. 11, the invention of an integrated membrane dryer and gas separation system would be particularly advantageous to a system designed with a structured adsorbent bed or other fast-cycle implementations utilizing many adsorbent beds.

Although it is preferable to sweep the membrane dryer in a fashion that it is not parasitic to the feed stream to the gas separation section, in some cases, it may be desirable to supplement the sweep stream from the exhaust with a portion of the feed gas. Such an implementation could still be more efficient than using feed gas alone as the sweep.

The efficiency of the system may be further enhanced by monitoring the dew-point of the feed gas after the dryer. In this case the amount of sweep gas directed to the sweep side of the dryer can be controlled to achieve a target dew-point.

The foregoing description of the preferred embodiment of the present invention has shown, described and pointed out the fundamental novel features of the invention. It will be understood that various omissions, substitutions, and changes in the form of the detail of the apparatus as illustrated as well as the uses thereof, may be made by those skilled in the art, without departing from the spirit of the invention. Consequently, the scope of the invention should not be limited to the foregoing discussions, but should be defined by appended claims.

We claim:

1. An oxygen concentrator comprising;
   at least one of a compressor or vacuum pump section,
   at least one of a PSA, VSA, or VPSA section including adsorbent beds for gas separation to produce oxygen rich product gas; and,
   a membrane dryer mounted in the concentrator with the dryer's inlet side disposed in the gas feed path between the compressor or vacuum pump and the adsorbent beds and the dryer's sweep side disposed to be swept by nitrogen rich exhaust gas from the gas separation section, wherein the sweep gas is at least 90% of the feed gas; wherein
   the oxygen concentrator is portable.

2. The concentrator of claim 1 further comprising a condenser and water trap disposed upstream of the absorbent beds.

3. The concentrator of claim 1 further comprising at least one desiccant layer of adsorbent disposed in the gas feed upstream of the adsorbent beds.

4. The concentrator of claim 2 further comprising at least one desiccant layer of adsorbent disposed in the gas feed upstream of the absorbent beds.

5. The concentrator of claim 1 wherein the dryer is adapted to further function as an exhaust gas acoustic muffler.

6. The concentrator of claim 1 wherein the purge flow from the membrane dryer is connected to a vacuum port of a pump in a VPSA system whereby the pressure drop across the membrane is enhanced due to the presence of a vacuum during bed evacuation and purge.

7. The concentrator of claim 6 further comprising a condenser and water trap disposed upstream of the absorbent beds.

8. The concentrator of claim 6 further comprising at least one desiccant layer of adsorbent disposed upstream of the absorbent beds.

9. The concentrator of claim 7 further comprising at least one desiccant layer of adsorbent disposed upstream of the absorbent beds.

10. The concentrator of claim 1 further comprising structured adsorbent in the adsorbent beds.

11. The concentrator of claim 1 wherein a portion of the sweep gas is routed directly from the membrane dryer feed stream in conjunction with the sweep gas from the gas separation exhaust.

12. The concentrator of claim 1 wherein the amount of sweep gas is controlled to achieve a target dew point level.

* * * * *